United States Patent
Zeljkovic et al.

(10) Patent No.: US 9,003,519 B2
(45) Date of Patent: Apr. 7, 2015

(54) VERIFYING TRANSACTIONS USING OUT-OF-BAND DEVICES

(75) Inventors: Ilija Zeljkovic, Scotch Plains, NJ (US); Juan Garay, Guttenberg, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 308 days.

(21) Appl. No.: 13/108,561

(22) Filed: May 16, 2011

(65) Prior Publication Data
US 2012/0297476 A1 Nov. 22, 2012

(51) Int. Cl.
*H04L 29/06* (2006.01)
(52) U.S. Cl.
CPC .......... *H04L 63/1466* (2013.01); *H04L 63/145* (2013.01); *H04L 63/18* (2013.01)
(58) Field of Classification Search
CPC ................................................. H04L 29/06326
USPC .............. 726/22–25; 713/187–188, 193–194; 709/203, 217–219
See application file for complete search history.

(56) References Cited

U.S. PATENT DOCUMENTS

| | | | | |
|---|---|---|---|---|
| 6,151,643 A * | 11/2000 | Cheng et al. | | 710/36 |
| 7,165,051 B2 * | 1/2007 | Ronning et al. | | 705/64 |
| 7,613,743 B1 * | 11/2009 | Giampaolo et al. | | 1/1 |
| 7,646,872 B2 * | 1/2010 | Brown et al. | | 380/277 |
| 7,933,881 B2 * | 4/2011 | Richey et al. | | 707/704 |
| 8,285,506 B2 * | 10/2012 | Oldham et al. | | 702/85 |
| 2005/0165684 A1 * | 7/2005 | Jensen et al. | | 705/44 |
| 2006/0107051 A1 * | 5/2006 | Lee et al. | | 713/171 |
| 2007/0234409 A1 * | 10/2007 | Eisen | | 726/6 |
| 2010/0299453 A1 * | 11/2010 | Fox et al. | | 709/246 |
| 2011/0271344 A1 * | 11/2011 | Unagami et al. | | 726/23 |
| 2013/0262658 A1 * | 10/2013 | Athale | | 709/224 |

* cited by examiner

*Primary Examiner* — Josnel Jeudy
(74) *Attorney, Agent, or Firm* — Hartman & Citrin LLC

(57) ABSTRACT

The present disclosure relates to verifying transactions using user devices. A client device used to complete a transaction with a server computer. The client device communicates with a user device such as a smart phone, laptop computer, or other computing device. The user device communicates with the client device and a verification server via the out-of-band communication channel. The verification server receives two or more copies of session data associated with the transaction occurring between the client device and the server computer. One copy of the session data is received from the server computer and another copy of the session data is provided by the user device. The two copies of the session data are compared by the verification server or by the user device, and mismatches are reported as suspected malicious software attacks.

20 Claims, 5 Drawing Sheets

VERIFYING TRANSACTIONS USING OUT-OF-BAND DEVICES

BACKGROUND

This application relates generally to electronic transactions. More particularly, the disclosure provided herein relates to verifying transactions using out-of-band devices.

As the levels of sophistication of computer and web technologies have increased, the level of sophistication of computer and web attackers have also increased. One sophisticated approach used to attack computers and web resources is commonly referred to as a "Trojan Horse" attack. In a Trojan Horse attack, malicious software masquerades as innocent software, thereby increasing the chances that the malicious software will be executed or installed by users.

While many forms of Trojan Horse attacks exist, a particularly pronounced threat is posed by what are known as "man-in-the-middle attacks," one example of which is referred to as a "man-in-the-browser attack." In a man-in-the-browser attack, malicious software used to attack a computer is executed by the attacked computer. The malicious software is capable of modifying a page or other content displayed by a web browser or other application during a transaction or application session. Thus, the malicious software executed in a man-in-the-browser attack is able to modify the transaction being completed via an attacked computer, while modifying display output. Thus, the malicious software is configured to ensure that the user believes the requested transaction is progressing as requested.

In one example of a man-in-the-browser attack, a user accesses a banking application to request transfer of money from a first account to a second account. Malicious software executed by the computer intercepts the requests generated by the computer and modifies the requests in real-time to alter parameters of the transaction. Similarly, the malicious software modifies output from the application and presents transaction or session data to the user in a manner that obscures the interference with the transaction. Thus, a user requesting, for example a one thousand dollar transfer between two accounts may unwittingly transfer ten thousand dollars to a third account, for example an account associated with the attacker. During this transaction, however, the malicious software obscures the parameters of the transaction to ensure that the user will be unaware of the attack until after the transaction is completed.

Various approaches are used to avoid man-in-the-browser attacks. In some approaches, an application verifies that a user is aware of a transaction by interacting with the user via a device separate from the device used to complete the transaction. For example, the application can generate a token or image that is emailed or otherwise transferred to a cell phone or other device associated with a user. Until the user verifies the token, image, or other information received from the application, and thereby ensures the user is aware of the transaction, the transaction is put on hold or blocked. These approaches require sophisticated token generation functions and delivery mechanisms, and also require users to input information such as passwords or tokens. Furthermore, these approaches do not address man-in-the-browser attacks in which the parameters associated with a transaction are modified by malicious software or other entities without the user's knowledge.

SUMMARY

The present disclosure is directed to systems and methods for verifying transactions using out-of-band devices. In one embodiment of the concepts and technologies disclosed herein, a device such as a client device is used to engage in or complete a transaction with a server computer. In some embodiments, the client device exchanges session data with the server computer, wherein the session data relates to or describes the transaction. According to various implementations, the client device communicates with a user device such as a laptop computer, a smart phone, a cell phone, a personal computer, a personal digital assistant ("PDA"), or other computing device. The user device can communicate with the client device via a wired or wireless network connection that is trusted and that operates out-of-band relative to the communication channel used to engage in or complete the transaction between the client device and the server computer. In other embodiments described herein, the user device and the server computer engage in a transaction and the client device is used to establish the out-of-band channel with the server computer.

In one embodiment of the concepts and technologies disclosed herein, a verification server operates on or in communication with a network. In some embodiments, the verification server communicates with the server computer and the user device via the out-of-band communication channel. The verification server can receive two versions or copies of the session data associated with the transaction occurring between the client device and the server computer. According to some embodiments, one version or copy of the session data is received from the server computer and represents the transaction being completed or engaged in from the perspective of the server computer. Thus, any parameters or other data changed by malicious software or other entities can be captured by analyzing this version or copy of the session data. Another version or copy of the session data represents the transaction being requested, engaged in, and/or completed from the perspective of the client device and is provided by the user device. According to various implementations of the concepts and technologies disclosed herein, the two versions or copies of the session data are compared to one another by the verification server, by the user device, and/or by the client device to determine if the parameters of the transaction correspond to one another and/or match one another at the client device, the user device, and/or the server computer.

According to various embodiments, the verification server, the client device, or the user device can take an action if a mismatch is identified. A "match" or "mismatch," as used herein, refers to cases in which the two or more versions of the session data represent transactions having the same parameters or not having the same parameters, respectively. As such, in some embodiments a "mismatch" is considered to exist if the versions or copies of the session data are not identical to one another and in other embodiments, a "mismatch" is considered to exist if the versions or copies of the session data are not complementary or do not represent the same transaction parameters. Thus, the versions of the session data may or may not be identical in all instances, even if no mismatch is identified. These and other embodiments will be explained in more detail herein.

In some embodiments, the verification server or the user device assumes that a man-in-the-browser attack is occurring if a mismatch is detected and/or if a match is not detected. The verification server, the user device, and/or the client device can be configured to and report the mismatch to one or more entities. In other embodiments, the mismatch is reported to the user device, the client device, and/or the server computer, and the transaction is interrupted or cancelled. In yet other embodiments, the user is notified via visual and/or audio alarms or presented with the session data from the server computer for visual inspection and/or verification.

According to one aspect, a computer-implemented method for verifying a transaction using a user device is provided. The method includes computer-implemented operations at least for obtaining, from a server computer in communication with a client device, a first version of session data, and obtaining, from the user device, a second version of the session data. The method also includes comparing the first version of the session data to the second version of the session data, and determining if a mismatch exists between the first version of the session data and the second version of the session data. The method also can include taking an action in response to determining that the mismatch exists.

In some embodiments, taking the action includes reporting the mismatch to at least one of the user device or the server computer. Taking an action also can include generating a command for interrupting the transaction to prevent completion of the transaction. The method also can include establishing a verification session in response to a request to establish the verification session. The request can be received from the user device, the client device, or the server computer. In some implementations, obtaining the first version of the session data and the second version of the session data includes obtaining the first version of the session data via an out-of-band communications channel and obtaining the second version of the session data via the out-of-band communications channel. The out-of-band communications channel can include a trusted connection between the user device and the client device. The trusted connection can include a short-range radio connection.

According to another aspect, another computer-implemented method for verifying a transaction at a user device is provided. The method includes computer-implemented operations at least for establishing a verification session by creating an out-of-band communication channel between the user device and a server computer in communication with a client device. The method also includes obtaining, from the server computer, a first version of session data corresponding to the transaction, and obtaining, from the client device, a second version of the session data corresponding to the transaction. The method also includes comparing the first version of the session data to the second version of the session data, determining if a mismatch exists between the first version of the session data and the second version of the session data, and taking an action, in response to determining that the mismatch exists.

In some embodiments, taking the action includes generating an alarm at the user device, the alarm indicating the mismatch. In other embodiments, taking the action includes generating a command for interrupting the transaction to prevent completion of the transaction, the command being transmitted to at least one of the client device or the server computer. Obtaining the first version of the session data and the second version of the session data can include obtaining the first version of the session data via an out-of-band communications channel and obtaining the second version of the session data via the out-of-band communications channel. The transaction can include execution of an application hosted by the server computer. The user device can include a smart phone, and the out-of-band communication channel can include a short range wireless connection between the smart phone and the client device.

According to yet another aspect, a computer storage medium has computer-executable instructions stored thereupon that, when executed by a computer, cause the computer at least to establish a verification session at a verification server in communication with a server computer hosting an application and a user device associated with a client device executing the application. The instructions also can cause the computer to establish an out-of-band communication channel for communicating between the user device, the verification server, and the server computer, to obtain, from the server computer, a first version of session data corresponding to the transaction, and to obtain, from the client device, a second version of the session data corresponding to the transaction. The instructions also can cause the computer to compare the first version of the session data to the second version of the session data, to determine if a mismatch exists between the first version of the session data and the second version of the session data, and to take an action, in response to determining that the mismatch exists.

In some embodiments, taking the action includes generating a command for providing an alarm indicating the mismatch, the alarm being provided by at least one of the user device or the client device. Taking the action also can include generating a command for interrupting the transaction, the command being transmitted to at least one of the client device or the server computer. In some embodiments, obtaining the first version of the session data and the second version of the session data includes obtaining the first version of the session data via an out-of-band communications channel and obtaining the second version of the session data via the out-of-band communications channel. In some embodiments, the instructions also can cause the computer to provide, via the out-of-band communication channel, at least one of the first version of the session data or the second version of the session data to the user device for display at the user device.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure, and be protected by the accompanying claims.

DETAILED DESCRIPTION

The following detailed description is directed to methods, systems, and computer-readable media for verifying transactions using out-of-band devices. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
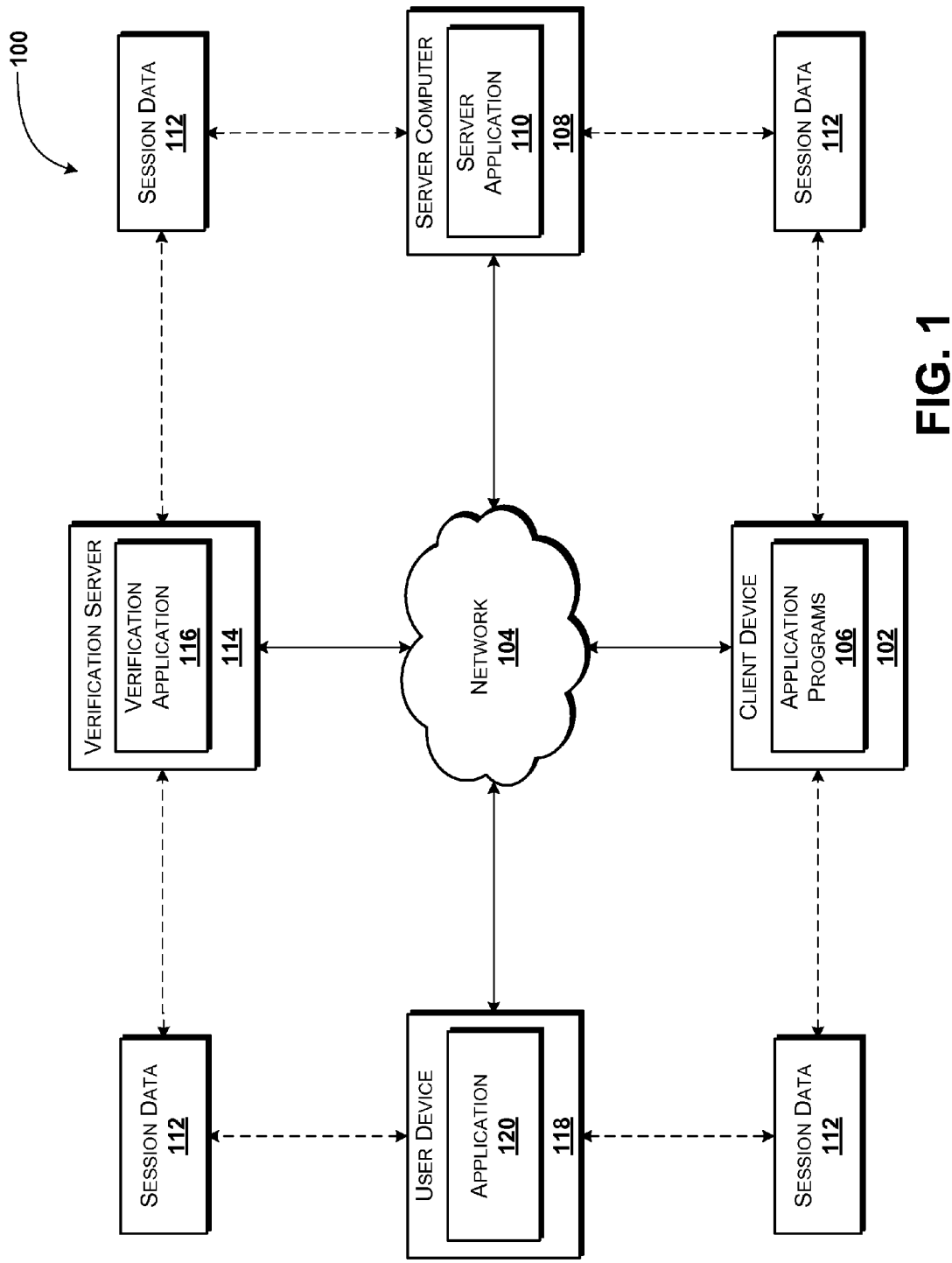
FIG. 1 is a system diagram schematically illustrating an illustrative operating environment for various embodiments disclosed herein.

Referring now to FIG. 1, aspects of an operating environment 100 for verifying transactions using out-of-band devices are illustrated, according to an illustrative embodiment. The system 100 includes a client device 102 operating on or in communication with a communications network 104 ("network"). According to various embodiments, the network 104 includes one or more networks including, but not limited to, cellular networks, packet data networks, and/or public switched telephone networks. The network 104 can be used to support one or more of an in-band communication channel and/or an out-of-band communication channel. An illustrative embodiment of the network 104 are described below with reference to FIG. 4.

The functionality of the client device 102 can be provided by any suitable computing system such as, for example, a personal computer ("PC"), a smart phone, a laptop computer, a tablet computer, a set-top box ("STB"), a personal digital assistant ("PDA"), a netbook computer, an embedded computing system, a server computer, other computing devices, combinations thereof, or the like. For purposes of describing the concepts and technologies disclosed herein in detail, the client device 102 is described herein as a personal computer. It should be understood that this embodiment is illustrative, and should not be construed as being limiting in any way.

The client device 102 is configured to execute an operating system (not illustrated) and one or more application programs 106. The operating system is a computer program for controlling the operation of the client device 102. Examples of suitable operating systems for the client device 102 include, but are not limited to, the WINDOWS family of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and LEOPARD families of operating systems from APPLE CORPORATION, the FREEBSD family of operating systems, other operating systems, and the like.

The application programs 106 are executable program configured to execute on top of the operating system to provide the functionality described herein for verifying transactions using user devices. For purposes of describing the concepts and technologies disclosed herein in detail, the application programs 106 are described herein as including, or being, a web browser that is configured to access content stored, hosted, executed, or otherwise associated with a server computer 108 operating on or in communication with the network 104. In the illustrated embodiment, the content includes, but is not limited to, a server application 110. It should be understood that this embodiment is illustrative, and should not be construed as being limiting in any way. More particularly, various implementations of the concepts and technologies disclosed herein include embodiments wherein the application programs 106 are stand-alone applications for accessing and/or executing web applications, web content, other applications and/or content, combinations thereof, and the like. Because the functionality of web browsers are generally understood, the applications programs 106 will not be further described herein.

According to some embodiments, the server application 110 includes an application that is executed by the server computer 108 to provide functionality associated with the server computer 108. For example, the server application 110 can provide functionality associated with a banking application to a user of the client device 102. During an application session or other transaction between the server application 110 and the client device 102, the client device 102 and the server computer 108 can generate and/or exchange session data 112 describing or representing parameters of the transaction. Thus, the session data 112 can include, but is not limited to, requests or other information generated by the client device 102, for example, authentication requests or information, requests for specific information or execution of specific functionality, combinations thereof and the like. The session data 112 also can include requests or responses generated by the server computer 108, as well as application data or other content for rendering by the client device 102. It should be understood that these embodiments are illustrative, and should not be construed as being limiting in any way.

In some embodiments, the server application 110 is an application executable by the server computer 108 to provide content to the client device 102. For example, the server application 110 can be configured to receive a request for content hosted by or accessible by the server computer 108, and to respond to the request with the requested content and/or with instructions for accessing the requesting content. For example, if the server computer 108 hosts a website, the server application 110 can be configured to receive a request for data corresponding to the website, retrieve the data from a data storage device, and/or to respond to the request with the data. It should be understood that these embodiments are illustrative, and should not be construed as being limiting in any way.

According to various implementations of the concepts and technologies disclosed herein, the operating environment 100 also includes a verification server 114 operating in communication with the server computer 108. In some implementations, the verification server 114 operates on or in communication with the network 104, though this is not necessarily the case. In the illustrated embodiment, the verification server 114 is configured to execute a verification application 116. It should be understood that this embodiment is illustrative, and should not be construed as being limiting in any way.

The verification application 116 is configured to establish what is referred to herein as a "verification session." During a verification session, the verification application 116 verifies transactions occurring between a client device 102 and a server computer 108. In some embodiments, the verification application 116 is configured to receive a copy of the session data 112 exchanged between the server computer 108 and the client device 102 during the transactions. The verification server 114 can receive the copy of the session data 112 from a user device 118 operating in communication with the verification server 114 and the client device 102, wherein the user device 118 receives the copy of the session data 112 via communications with the client device 102. According to various implementations, the functionality of the user device 118 is provided by a smart phone, a laptop computer, a tablet computer, a personal digital assistant ("PDA"), or other suitable computing device. For purposes of describing the concepts and technologies disclosed herein, the user device 118 is described as a smart phone. It should be understood that this embodiment is illustrative, and should not be construed as being limiting in any way.

Additionally, or alternatively, the verification server 114 can receive the copy of the session data 112 from the server computer 108. In one implementation, the verification server 114 receives the session data 112 from the server computer 108 and the user device 118, and compares the session data 112 received from both sources to ensure the session data 112 from both sources match. As mentioned above, in some embodiments, the two or more versions of the session data 112 are analyzed to determine if transaction parameters described by the two or more versions of the session data 112 are consistent with one another. In other embodiments, the two or more versions of the session data 112 are analyzed to determine if transaction parameters described by the two or more versions of the session data 112 are identical to one another. In yet other embodiments, the two or more versions of the session data 112 are analyzed to determine if transaction parameters described by the two or more versions of the session data 112 are complementary to one another. As such, it should be appreciated that a "match" or "mismatch" identified during a comparison of two or more copies or versions of the session data 112 can include determining that the transaction parameters described by the two or more copies or versions of the session data 112 are identical, are not identical, are complementary to one another, are not complementary to one another, correspond to one another, do not correspond to one another, and/or otherwise do or do not relate to the same transaction parameters.

Additionally, while the word "verification" and variants thereof are used to describe the functionality of the verification server 114 or other devices analyzing the session data 112, it should be understood that "verifying" transactions can include determining that the transactions are good, determining that the transactions are not good, and/or combinations thereof. If the session data 112 received from the sources do not match, the verification server 114 can take one or more actions to indicate the mismatch. The existence of a mismatch can indicate to the verification server 114 that a transaction between the client device 102 and the server computer 108 has been compromised, for example, by a man-in-the-browser attack or due to other malicious or benign activities. The mismatch also can indicate an error due to various other causes, and as such, this embodiment should not be construed as being limiting in any way.

According to various implementations, the verification server 114 communicates with the user device 118 and/or the server computer 108 using an out-of-band communication channel established over the network 104 and/or other networks or connections (not illustrated). As such, the verification server 114 can communicate with the user device 118 and/or the server computer 108 via an isolated communication path that can be configured to ensure safe and/or private delivery of the session data 112 to the verification server 114 for verification purposes, as explained herein in more detail. In some embodiments, the out-of-band communication channel is provided by the network 104 by enforcing or using transport layer security ("TLS") protocols, secure sockets layer ("SSL") protocols, and/or other privacy and/or security technologies. It should be understood that these embodiments are illustrative, and should not be construed as being limiting in any way.

As mentioned above, the user device 118 is configured to communicate with the client device 102. In some embodiments, the user device 118 communicates with the client device 102 via a local connection such as a hardwire connection, a BLUETOOTH or other short range radio technology connection, a local wired or wireless network connection, combinations thereof, and the like. In some embodiments, the user device 118 executes an application 120. The application 120 is configured to verify transactions occurring between the client device 102 and the server computer 108. As such, the user device 118 can be configured to provide the functionality associated with the verification session described above with reference to the verification server 114, if desired.

In other embodiments, the application 120 is configured to communicate with the verification server 114 to assist the verification server 114 in verifying the transactions. Thus, the application 120 can be configured to provide the session data 112, or a copy thereof, to the verification server 112, to request establishment of the verification session, to interrupt compromised transactions, and/or to communicate with a user or other authorized entity to indicate that a transaction between the client device 102 and the server computer 118 has been compromised. These and other functions of the application 120 are described below in more detail, particularly with reference to FIGS. 2 and 3.

As will be explained in more detail below, the client device 102 exchanges session data 112 with the server computer 108, for example, during a banking session, other application sessions, and/or other transactions. The client device 102 also communicates with the user device 118. One or more of the user device 118 and the server computer 108 is configured to request establishment of or to establish a verification session to ensure that the transaction occurring between the client device 102 and the server computer 108 is protected from third party interference. Third party interference includes man-in-the-middle attacks, man-in-the-browser attacks, other malicious attacks, and the like.

During the verification session, the user device 118 and the server computer 108 can be configured to capture one or more copies of the session data 112 exchanged between the client device 102 and the server computer 108. Thus, for example, the user device 118 can obtain a copy of the session data 112 from the client device 102. As mentioned above, and explained in more detail below with reference to FIGS. 2-5, the user device 118 and/or the verification server 114 can compare the copy of the session data 112 obtained from the user device 118 to a copy of the session data 112 obtained from the server computer 108. Thus, the user device 118 and/or the verification server 114 can determine if a transaction between the client device 102 and the server computer 108 is safe from interference and/or if security of the transaction has been compromised.

FIG. 1 illustrates one client device 102, one network 104, one server computer 108, one verification server 114, and one user device 118. It should be understood, however, that some implementations of the operating environment 100 include multiple client devices 102, multiple networks 104, multiple server computers 108, multiple verifications servers 114, and/or multiple user devices 118. In particular, in some embodiments the user device 118 is configured to communicate with any number of client devices 102 to verify transactions associated with the client devices 102. Thus, for example, a single user device 118 can be used to verify any transactions occurring using any number of client devices 102 associated with a particular user or location. As such, the illustrated operating environment 100 should be understood as being illustrative, and should not be construed as being limiting in any way.

Furthermore, while FIG. 1 has been described with respect to embodiments wherein the user device 118 is used to establish an out-of-band communications channel and the client device 102 is used to complete a transaction, it should be understood that other embodiments are contemplated and are possible. In particular, as is explained in more detail below, the client device 102 can be used to establish an out-of-band communication channel and the user device 118 can be used to complete or engage in a transaction with a server computer 108 and/or other devices. Thus, the functionality described herein with respect to the client device 102 for engaging in a transaction and the functionality described herein with respect to the user device 118 for verifying a transaction can be performed by the user device 118 and the client device 102, respectively. As such, the embodiments described herein should be understood as being illustrative of the concepts and technologies disclosed herein, and should not be construed as being limiting in any way.

Figure 2:
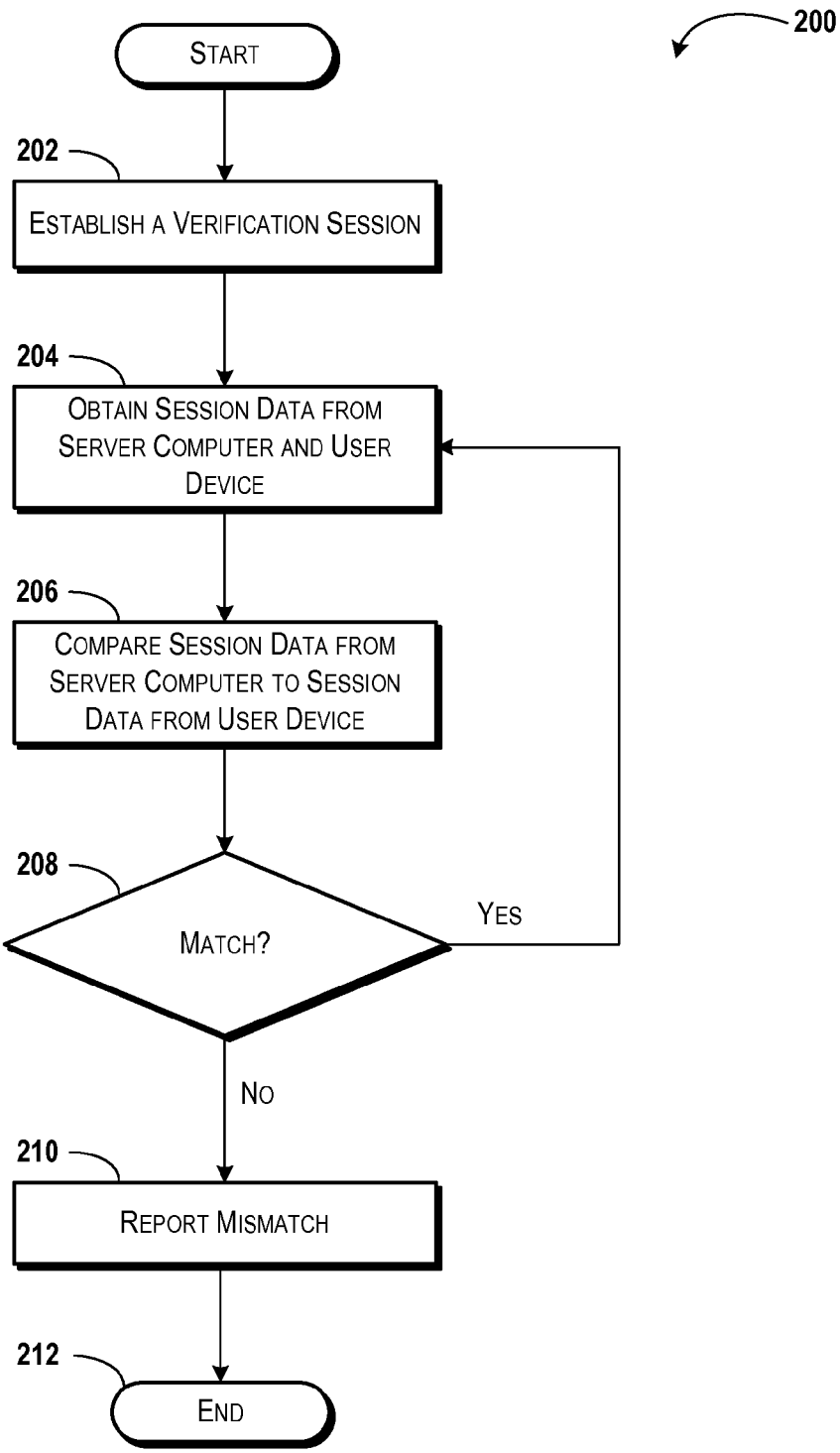
FIG. 2 is a flow diagram showing aspects of a method for verifying transactions using out-of-band devices, according to an illustrative embodiment.

Turning now to FIG. 2, aspects of a method 200 for verifying transactions using an out-of-band device will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used in the description and claims, is used expansively hereinto include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof.

For purposes of illustrating and describing the concepts of the present disclosure, the method 200 is described as being performed by the verification server 114. It should be understood that the verification server 114, as well as additional and/or alternative devices and/or network nodes, can provide the functionality described herein via execution of one or more application programs including, but not limited to, the verification application 116. Furthermore, it should be understood that the functionality of the verification server 114 can be provided by any number of devices or network nodes, and is not limited to the verification server 114 illustrated in the FIGURES. Similarly, the method 200 is described with reference to an embodiment wherein the user device 118 functions as an out-of-band device. As noted above, the user device 118 can complete or engage in a transaction, and the client device 102 or other devices or nodes can provide the out-of-band devices. As such, the illustrated embodiment is illustrative, and should not be viewed as being limiting in any way.

The method 200 begins at operation 202, wherein the verification server 114 establishes a verification session with the user device 118 and the server computer 108. In some embodiments, the verification server 114 establishes the verification session in response to receiving a request to verify a transaction occurring between the client device 102 and the server computer 108. The request can be received from the server computer 108, the user device 118, or other devices or nodes. For example, in some implementations the server application 110 is configured to prompt establishment of the verification session in response to receiving or sending session data 112 from or to the client device 102. In other embodiments, the verification server 114 establishes the verification session in response to receiving a request from the user device 118. It should be understood that these embodiments are illustrative, and should not be construed as being limiting in any way. In particular, the functionality described herein for establishing a verification session can be requested or can be prompted by any suitable users and/or devices.

As explained above, the exchange of the session data 112 between the server computer 108 and the client device 102 can be associated with execution of a web application, rendering of web content, streaming or downloading of media or other content, other transactions, combinations thereof, and the like. The server application 110 can be configured to provide functionality associated with the exchange of the session data 112 and/or to prompt establishment of the verification session in response to exchanging the session data 112 with the client device 102. As mentioned above, the verification session established between the user device 118 and the verification server 114 can occur over an out-of-band connection provided by the network 104. As such, the verification session established by the verification server 114 can be isolated from the exchange of the session data 112 between the client device 102 and the server computer 108, if desired.

From operation 202, the method 200 proceeds to operation 204, wherein the verification server 114 obtains the session data 112 from the server computer 108 and from the user device 118. The server application 110 can be configured to exchange the session data 112 with the client device 102 to provide functionality associated with the server computer 108, as explained above. Additionally, according to various embodiments of the concepts and technologies disclosed herein, the server application 110 can be configured to exchange session data 112 with the verification server 114. In particular, the verification server 114 receives the session data 112 from the client device 102 by way of the user device 118, and provides a copy of the session data 112 generated by the client device 102 to the server computer 108. Similarly, the server computer 108 generates the session data 112 during communications with the client device 102 and provides a copy of the session data 112 generated by the server computer 108 to the verification server 114.

As such, the verification server 114 is configured to receive the session data 112 from the server computer 108, wherein the session data 112 received from the server computer 108 corresponds to output generated by the server computer 108 during communications with the client device 102. The verification server 114 also is configured to receive session data 112 from the user device 118, wherein the session data 112 received from the user device 118 corresponds to input generated by the client device 102 during communications with the client device 102. Thus, the verification server 114 can receive copies of the session data 112 exchanged by the server computer 108 and the client device 102.

From operation 204, the method 200 proceeds to operation 206, wherein the verification server 114 compares the session data 112 received from the server computer 108 to a copy of the session data 112 received from the client device 102 by way of the user device 118. As such, the verification server 114 can determine if there exist any differences between the session data 112 received or sent by the client device 102 from or to the server computer 108 and the session data 112 received or sent by the server computer 108 from or to the client device 102. As mentioned above, various attacks are based upon intercepting and changing the session data 112 during a transaction. One example of such an attack is the man-in-the-browser attack, wherein the attacker changes the session data 112 for various purposes and obscures the changes from the user. For example, if the transaction corresponds to a banking transaction such as an account transfer, the attacker may intercept "transfer to account," "amount of transfer," and/or other information from the client device 102, substitute other account, amount, or other information, and pass the modified session data 112 to the server computer 108. The sever computer 108 may generate the session data 112 based upon the modified session data 112 and return session data 112 confirming the transaction to the client device 102.

The attacker again intercepts the returned session data 112 and modifies the session data 112 to reflect the parameters originally entered by the user at the user device 102. The again-modified session data 112 is returned to the client device 102 for display. As such, a user of the client device 102 may believe that the transaction has occurred as requested, though in reality the parameters of the transaction may have been modified in any number of ways. The verification server 114 therefore is configured to compare what is sent/received from the server computer 108 to what is sent/received from the client device 102.

From operation 206, the method 200 proceeds to operation 208, wherein the verification application 116 determines if the session data 112 received from the server computer 108 matches the session data 112 received from the client device 102, for example by way of the user device 118. If the verification server 114 determines, in operation 208, that the session data 112 received from the user device 118 matches the session data 112 received from the server computer 108, the method 200 can return to operation 204, wherein the verification server 114 waits for another exchange of session data 112. As such, the verification server 114 may wait until a new operation or transaction occurs, or until functionality associated with the verification server 114 is again requested. In other implementations of the method 200, the method 200 can end if the verification server 114 determines that the session data 112 received from the user device 118 matches the session data 112 received from the server computer 108.

If the verification server 114 determines, in operation 208, that the session data received from the user device 118 does not match the session data 112 received from the server computer 108, the method 200 proceeds to operation 210. At operation 210, the verification application 116 reports the mismatch identified in operation 208. According to various implementations, the verification server 114 reports the mismatch to the server computer 108. The server application 110 can be configured to interrupt a transaction in response to receiving a report of a mismatch. In other implementations, the verification server 114 reports the mismatch to the user device 118. The user device 118 can be configured to generate an audio or visual alarm indicating the mismatch, or to trigger display of such an alarm at the client device 102. In yet other implementations, the user device 118 communicates the mismatch to the client device 102, and the client device 102 interrupts the transaction in response to the reported mismatch.

In some embodiments, the user device 118 is configured to display the session data 112 received by the verification server 114, thus allowing a user or other entity to see changes made to the session data 112. A user or other entity also can be provided with an opportunity to override the alarm or transaction interrupt functionality described herein, if desired. As such, some embodiments of the concepts and technologies disclosed herein rely upon user interactions to stop the transaction, while other embodiments interrupt the transaction automatically. In still other embodiments, the user device 118 displays the session data 112 during a transaction and a user is expected to review the session data 112 to determine if the transaction is to be completed. While FIG. 2 illustrates reporting a mismatch, it should be understood that reporting as described herein is illustrative, and that the verification server 114 can take other actions and/or no action, if desired. As such, the functionality described with respect to operation 210 can be omitted or substituted with other functionality, if desired. From operation 210, the method 200 proceeds to operation 212. The method 200 ends at operation 212.

Figure 3:
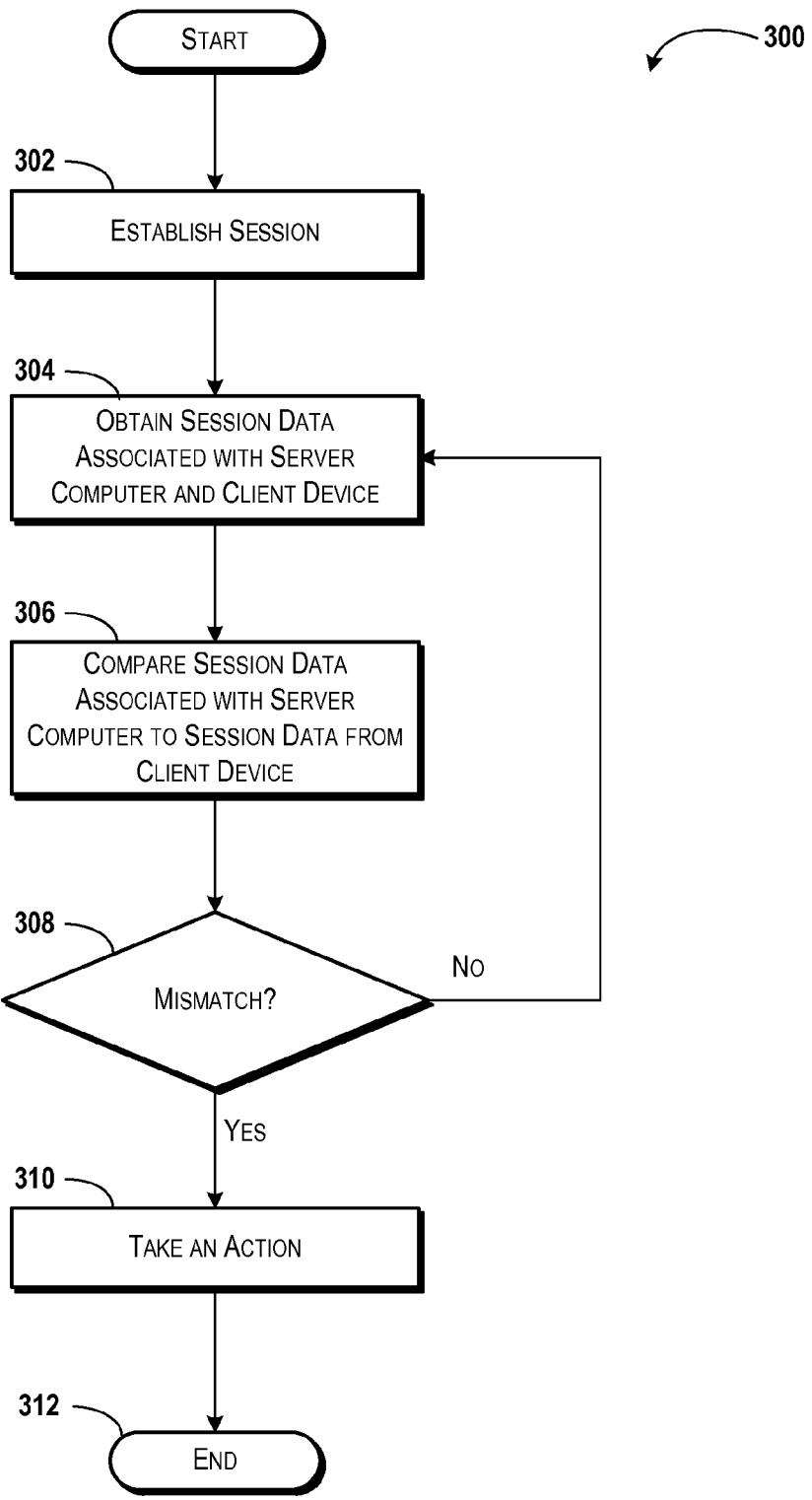
FIG. 3 is a flow diagram showing aspects of another method for verifying transactions using out-of-band devices, according to an illustrative embodiment.

Turning now to FIG. 3, aspects of a method 300 for verifying transactions using out-of-band devices will be described in detail, according to another illustrative embodiment. For purposes of illustrating and describing the concepts of the present disclosure, the method 300 is described as being performed by the user device 118 via execution of the application 120. As noted above, the user device 118 can complete or engage in a transaction, and the client device 102 or other devices or nodes can provide the out-of-band devices. As such, the illustrated embodiment is illustrative, and should not be viewed as being limiting in any way.

The method 300 begins at operation 302, wherein the user device 118 establishes a verification session. Although the verification session has been described herein as being established, and executed, by the verification server 114, this is not necessarily the case. In particular, in some embodiments, the user device 118 communicates with the server computer 108 to provide the functionality described herein for verifying transactions. As such, the user device 118 can obtain a copy of the session data 112 from the server computer 108 and the verification server 114 can be bypassed or omitted. In other implementations, the user device 118 receives the copy of the session data from the verification server 114. For purposes of describing the various implementations of the concepts and technologies disclosed herein, the method 300 is described as occurring on one of several embodiments of the system 100 that include and/or omit the verification server 114. In light of the above description, it should be understood that these embodiments are illustrative and should not be construed as being limiting in any way.

From operation 302, the method 300 proceeds to operation 304, wherein the user device 118 obtains the session data 112 associated with the server computer 108 and obtains the session data 112 from the client device 102. As explained above with reference to FIGS. 1-2, in some embodiments the user device 118 obtains the session data 112 from the server computer 108, while in other embodiments the user device 118 obtains the session data 112 by way of the verification server 114. These and other embodiments are included in the scope of the method 300 illustrated in FIG. 3.

From operation 304, the method 300 proceeds to operation 306, wherein the user device 118 compares the session data 112 associated with the server computer 108 to the session data 112 obtained from the client device 102. The operation 304 can be substantially similar to the operation 204 described above, though the user device 118 can provide the functionality described herein with reference to operation 304 instead of, or in addition to, the verification server 114.

From operation 306, the method 300 proceeds to operation 308, wherein the user device 118 determines if there is a mismatch between the session data 112 associated with the server computer 108 and the session data 112 obtained from the client deice 102. If the user device 118 determines, in operation 308, that no mismatch exists between the session data 112 associated with the server computer 108 and the session data 112 obtained from the client deice 102, the method 300 can return to operation 304. As such, the user device 118 can wait for another transaction or operation, and can obtain the session data 112 generated or associated with the transaction or operation.

If the user device 118 determines, in operation 308, that a mismatch exists between the session data 112 associated with the server computer 108 and the session data 112 obtained from the client deice 102, the method 300 can proceed to operation 310. At operation 310, the user device 118 can take an action. For example, the user device 118 can report the mismatch identified in operation 308. As noted above, the action taken by the user device 118 can include, but is not limited to, generating audio and/or visual alarms, interrupting transactions occurring between the client device 102 and the server computer 108, reporting the mismatch to one or more of the client device 102 and the server computer 108, and/or other actions.

Although taking an action is illustrated in FIG. 3, it should be understood that this embodiment is illustrative. In particular, in some embodiments the user device 118 takes no action in response to detecting the mismatch. Rather, as noted above, the user device 118 is configured in some embodiments to display the session data 112 associated with the server computer 108, thus allowing a user to see and/or take action based upon the mismatch. A user can be provided with an opportunity to override the alarm or transaction, as noted above. As such, some embodiments of the concepts and technologies disclosed herein rely upon user interactions to stop the transaction, while other embodiments interrupt the transaction automatically.

In still other embodiments, the user device 118 displays the session data 112 during a transaction and a user is expected to review the session data 112 to determine if the transaction is to be completed. As such, the user device 118 may not explicitly report the mismatch, though the mismatch may be readily apparent to a user reviewing the session data displayed by the user device 118 and the session data 112 displayed by the client device 102. Other actions are possible and are contemplated. As such, the functionality described with respect to operation 310 can be omitted, if desired. From operation 310, the method 300 proceeds to operation 312. The method 300 ends at operation 312.

As noted above, while the above description has described the user device 118 as being a part of and/or establishing the out-of-band communication channel, this is not necessarily the case. Similarly, while the above description has referred to the client device 102 as completing and/or engaging in a transaction with the server computer 108, this is not necessarily the case. In particular, some embodiments of the concepts and technologies disclosed herein include completing and/or engaging in a transaction with a user device 118 and establishing an out-of-band channel that includes the client device 102 to verify the transaction. As such, the embodiments described above should be understood as being illustrative, and should not be construed as being limiting in any way.

In some embodiments, the user device 118, and/or other devices or nodes verifying transactions, can be made oblivious to the actual transaction parameters of the transaction the device or node is verifying. For example, in some embodiments, various values or other information in the session data 112 are obscured or masked prior to sharing with the user device 118 and/or other devices. This can be done by having the client device 102 and the verification server 114 configured to mask or obscure data in the session data 112 before sharing the session data 112 with the user device 118 or other devices or nodes. In an instantiation of this configuration, the client device 102 and the verification server 114 share a cryptographic key which enables them to apply a (the same) cryptographic transformation to the session data 112. In some embodiments, this approach can be used to guarantee data confidentiality. The client device 102 and the verification server 114 also can share with the user device 118 and/or other devices performing the verification the outcome of the transformation. Examples of the cryptographic transformation include encryption of the session data using a block cipher such as AES, masking the session data by means of the exclusive-OR (XOR) operation with the outcome of a key-ed pseudo-random function applied to suitable parameters, and/or via other processes. It should be understood that these embodiments are illustrative, and should not be construed as being limiting in any way.

While the above description has described various transactions, it should be understood that the concepts and technologies disclosed herein are not limited to any particular transaction or type of transaction. In particular, a "transaction" can include various other types of activity including, but not limited to, software updates, media downloads or streaming sessions, information sharing, login processes, and/or other transactions. As such, a "transaction" can include any sharing or submission of data, and therefore any such submission of data can be verified using embodiments of the concepts and technologies disclosed herein.

In one non-limiting example of a transaction, a client device 112 is updated. For example, a firmware, software, application, or other information stored or executed by the client device 102 can be updated via a session with a server computer 108 or other node or device. The server computer 108 or other device can generate a checksum, key-ed hash, or other representation of the updated information and send the representation of the information to the user device 118. The representation can, but is not necessarily, sent with a copy of the information at issue.

The client device 102 can also generate the key-ed hash, checksum, or other representation and send the result to the user device 108 to verify that both received hashes, checksums, or other representations match. In light of the description above, it can be appreciated that these embodiments can allow verification of a software update in a manner similar to that described above with respect to a banking transaction. It should be understood that this embodiment is illustrative, and should not be construed as being limiting in any way.

As such, it can be appreciated that the concepts and technologies disclosed herein can be used to insure that malware or other malicious instructions are not included in a downloaded file, software update, firmware update, or other information. Similarly, it can be appreciated that according to the various embodiments disclosed herein, any suitable devices can be used to engage in or complete transactions via a first channel, for example a primary or in-band channel, and that any suitable devices can also be used to verify transactions via an out-of-band or secondary communications channel, irrespective of the particular type of device used to complete or engage in, or verify, the transactions.

Figure 4:
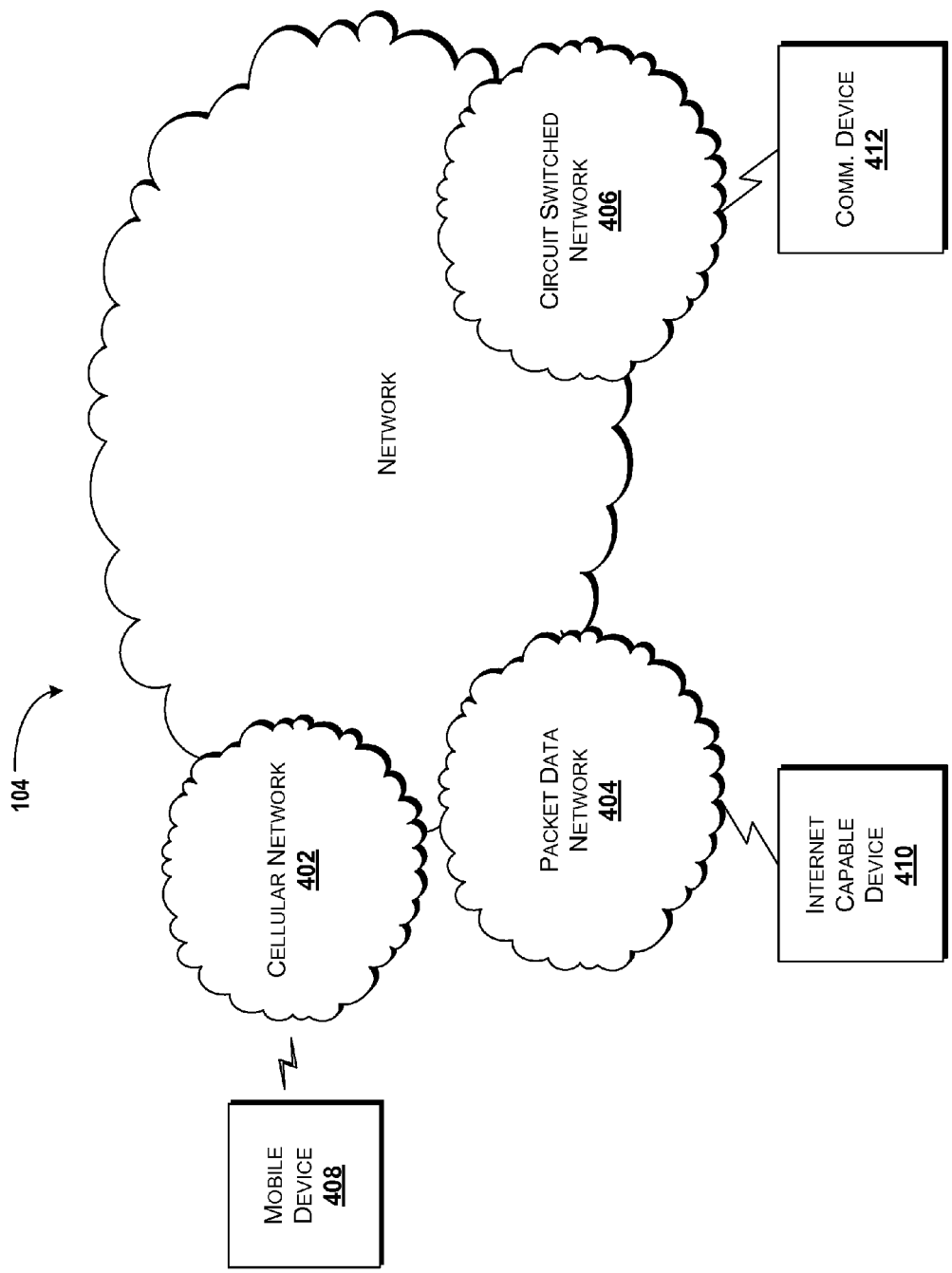
FIG. 4 schematically illustrates a network, according to an illustrative embodiment.

Turning now to FIG. 4, additional details of the network 104 are illustrated, according to an illustrative embodiment. The network 104 includes a cellular network 402, a packet data network 404, for example, the Internet, and a circuit switched network 406, for example, a publicly switched telephone network ("PSTN"). The cellular network 402 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 402 also includes radios and nodes for receiving and transmitting voice, data, and combinations thereof to and from radio transceivers, networks, the packet data network 404, and the circuit switched network 406.

A mobile communications device 408, such as, for example, a cellular telephone, a user equipment, a mobile terminal, a PDA, a laptop computer, a handheld computer, and combinations thereof, can be operatively connected to the cellular network 402. The cellular network 402 can be configured as a 2G GSM network and can provide data communications via GPRS and/or EDGE. Additionally, or alternatively, the cellular network 402 can be configured as a 3G UMTS network and can provide data communications via the HSPA protocol family, for example, HSDPA, EUL (also referred to as HSUPA), and HSPA+. The cellular network 402 also is compatible with 4G mobile communications standards as well as evolved and future mobile standards.

The packet data network 404 includes various devices, for example, servers, computers, databases, and other devices in communication with another, as is generally known. The packet data network 404 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 404 includes or is in communication with the Internet. The circuit switched network 406 includes various hardware and software for providing circuit switched communications. The circuit switched network 406 may include, or may be, what is often referred to as a plain old telephone system (POTS). The functionality of a circuit switched network 406 or other circuit-switched network are generally known and will not be described herein in detail.

The illustrated cellular network 402 is shown in communication with the packet data network 404 and a circuit switched network 406, though it should be appreciated that this is not necessarily the case. One or more Internet-capable devices 410, for example, a PC, a laptop, a portable device, or another suitable device, can communicate with one or more cellular networks 402, and devices connected thereto, through the packet data network 404. It also should be appreciated that the Internet-capable device 410 can communicate with the packet data network 404 through the circuit switched network 406, the cellular network 402, and/or via other networks (not illustrated).

As illustrated, a communications device 412, for example, a telephone, facsimile machine, modem, computer, or the like, can be in communication with the circuit switched network 406, and therethrough to the packet data network 404 and/or the cellular network 402. It should be appreciated that the communications device 412 can be an Internet-capable device, and can be substantially similar to the Internet-capable device 410. In the specification, the network 104 is used to refer broadly to any combination of the networks 402, 404, 406. It should be appreciated that substantially all of the functionality described with reference to the network 104 can be performed by the cellular network 402, the packet data network 404, and/or the circuit switched network 406, alone or in combination with other networks, network elements, and the like.

Figure 5:
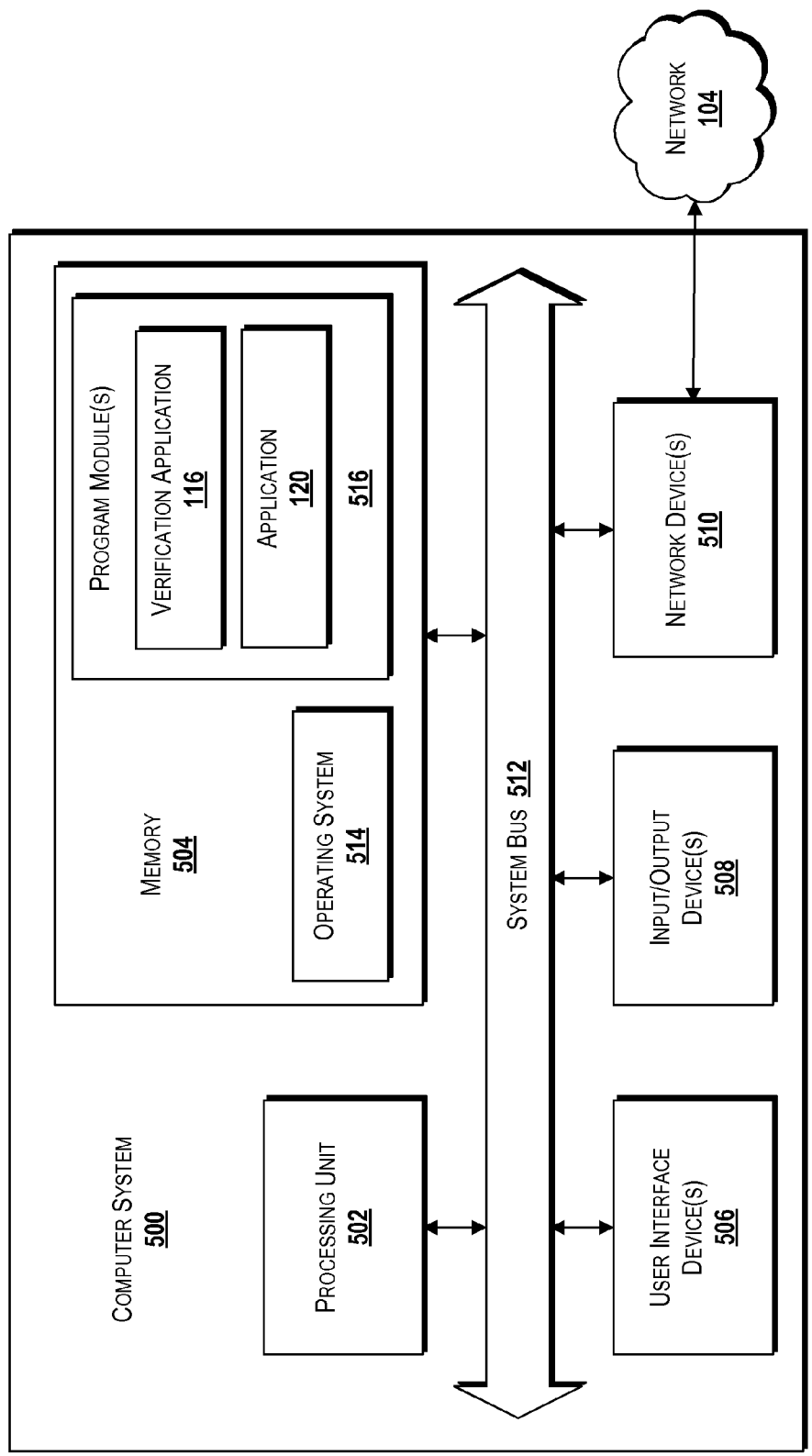
FIG. 5 is a block diagram illustrating an example computer system configured to verify transactions using out-of-band devices, according to some illustrative embodiments.

FIG. 5 is a block diagram illustrating a computer system 500 configured to verify transactions using user devices, in accordance with various embodiments of the concepts and technologies disclosed herein. The computer system 500 includes a processing unit 502, a memory 504, one or more user interface devices 506, one or more input/output ("I/O") devices 508, and one or more network devices 510, each of which is operatively connected to a system bus 512. The bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 504 communicates with the processing unit 502 via the system bus 512. In some embodiments, the memory 504 is operatively connected to a memory controller (not shown) that enables communication with the processing unit 502 via the system bus 512. The memory 504 includes an operating system 514 and one or more program modules 516. The operating system 514 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like. The program modules 516 may further include one or more of the verification application 116 and/or the application 120. In some embodiments, the verification application 116 and/or the application 120 are embodied in computer-readable media containing instructions that, when executed by the processing unit 502, perform one or more of the methods 200, 300 for verifying transactions using user devices, as described in detail above with respect to FIGS. 2-3. According to embodiments, the program modules 516 may be embodied in hardware, software, firmware, or any combination thereof.

By way of example, and not limitation, computer-readable media may include any available computer storage media or communication media that can be accessed by the computer system 500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500. In the claims, the phrase "computer storage medium" and variations thereof, does not include waves, signals, and/or other transitory and/or intangible communication media, per se.

The user interface devices 506 may include one or more devices with which a user accesses the computer system 500. The user interface devices 506 may include, but are not limited to, computers, servers, personal digital assistants, cellular phones, or any suitable computing devices. The I/O devices 508 enable a user to interface with the program modules 516. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer.

The network devices 510 enable the computer system 500 to communicate with other networks or remote systems via a network, such as the network 104. Examples of the network devices 510 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 106 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Based on the foregoing, it should be appreciated that systems and methods for verifying transactions using user devices have been disclosed herein. Although the subject matter presented herein has been described in language specific to computer structural features, methodological and transformative acts, specific computing machinery, and computer-readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

We claim:

1. A method comprising:
   obtaining, by a verification server executing a verification application, a first version of session data from a server computer, the first version of the session data describing a transaction occurring between the server computer and a client device, the first version of the session data representing the session data received by the server computer from the client device during the transaction;
   obtaining, by the verification server from a user device associated with a user of the client device, a second version of the session data that describes the transaction, the second version of the session data representing the session data sent by the client device to the server computer during the transaction;
   comparing, by the verification server, the first version of the session data to the second version of the session data;
   determining, by the verification server, if a mismatch exists between the first version of the session data and the second version of the session data; and
   if a determination is made that the mismatch exists, taking an action.

2. The method of claim 1, wherein taking the action comprises reporting the mismatch to the user device.

3. The method of claim 1, wherein taking the action comprises generating a command for interrupting the transaction to prevent completion of the transaction.

4. The method of claim 1, further comprising establishing a verification session in response to a request to establish the verification session.

5. The method of claim 1, wherein the user device comprises a smart phone and the client device comprises a personal computer.

6. The method of claim 1, wherein obtaining the first version of the session data and the second version of the session data comprises obtaining the first version of the session data via an out-of-band communications channel and obtaining the second version of the session data via the out-of-band communications channel.

7. The method of claim 6, wherein the out-of-band communications channel comprises a trusted connection between the user device and the client device.

8. The method of claim 7, wherein the out-of-band communications channel further comprises a trusted connection between the user device, the verification server, and the server computer.

9. A verification server comprising:
   a processor; and
   a memory storing instructions that, when executed by the processor, cause the processor to perform operations comprising
   obtaining, from a server computer, a first version of session data that describes a transaction occurring between a client device and the server computer, the first version of the session data representing the session data received by the server computer from the client device during the transaction, obtaining, from a user device associated with a user of the client device, a second version of the session data that describes the transaction, the second version of the session data representing the session data sent by the client device to the server computer during the transaction, comparing the first version of the session data to the second version of the session data, determining if a mismatch exists between the first version of the session data and the second version of the session data, and taking an action, in response to determining that the mismatch exists.

10. The verification server of claim 9, wherein taking the action comprises reporting the mismatch to the user device.

11. The verification server of claim 9, wherein taking the action comprises generating a command for interrupting the transaction to prevent completion of the transaction, the command being transmitted to at least one of the client device or the server computer.

12. The verification server of claim 9, wherein obtaining the first version of the session data and the second version of the session data comprises obtaining the first version of the session data via an out-of-band communications channel and obtaining the second version of the session data via the out-of-band communications channel.

13. The verification server of claim 9, wherein the transaction comprises a software update for the client device, the software update being received at the client device from the server computer, and wherein the first version of the session data comprises a hash of updated information associated with the software update, the hash being generated by the server computer.

14. The verification server of claim 12, wherein the user device comprises a smart phone, and wherein the out-of-band communications channel comprises a trusted connection between the smart phone and the client device.

15. A computer storage medium having computer-executable instructions stored thereupon that, when executed by a verification server comprising a processor, cause the processor to perform operations comprising:

obtaining, from a server computer, a first version of session data that describes a transaction occurring between a client device and the server computer, the first version of the session data representing the session data received by the server computer from the client device during the transaction;

obtaining, from a user device associated with a user of the client device, a second version of the session data that describes the transaction, the second version of the session data representing the session data sent by the client device to the server computer during the transaction;

comparing the first version of the session data to the second version of the session data;

determining if a mismatch exists between the first version of the session data and the second version of the session data; and taking an action, in response to determining that the mismatch exists.

16. The computer storage medium of claim 15, wherein taking the action comprises generating a command for providing an alarm indicating the mismatch, the alarm being provided by at least one of the user device or the client device.

17. The computer storage medium of claim 15, wherein taking the action comprises generating a command for interrupting the transaction, the command being transmitted to at least one of the client device or the server computer.

18. The computer storage medium of claim 15, wherein obtaining the first version of the session data and the second version of the session data comprises obtaining the first version of the session data via an out-of-band communications channel and obtaining the second version of the session data via the out-of-band communications channel.

19. The computer storage medium of claim 18, wherein the operations further comprise providing, via the out-of-band communications channel, at least one of the first version of the session data or the second version of the session data to the user device for display at the user device.

20. The method of claim 1, wherein the transaction comprises a banking transaction conducted via a banking application hosted by the server computer.

* * * * *